(12) United States Patent
Luster

(10) Patent No.: US 7,549,248 B1
(45) Date of Patent: Jun. 23, 2009

(54) ANIMAL DECOY

(75) Inventor: Michael A. Luster, Jackson, NJ (US)

(73) Assignee: Gary Castle, Gramsville, NY (US), part interest ( * ) Notice: Subject to any disclaimer, the term of this patent is extended or adjusted under 35 U.S.C. 154(b) by 0 days.

(21) Appl. No.: 11/900,805

(22) Filed: Sep. 12, 2007

(51) Int. Cl.
*A01M 31/06* (2006.01)

(52) U.S. Cl. .................. 43/2; 40/479; 40/412; 446/217

(58) Field of Classification Search .......... 43/2, 43/3; 40/477, 479, 412, 440; 446/217; 116/173, 116/175
See application file for complete search history.

(56) References Cited

U.S. PATENT DOCUMENTS

| | | | | |
|---|---|---|---|---|
| 146,334 A * | 1/1874 | Hagstrom | .................... | 446/217 |
| 223,493 A * | 1/1880 | Evans | ........................... | 40/479 |
| 244,038 A * | 7/1881 | Danz, Jr. | .......................... | 43/3 |
| 274,124 A * | 3/1883 | Keller | .............................. | 43/3 |
| 282,851 A * | 8/1883 | Danz, Jr. | .......................... | 43/3 |
| 293,850 A * | 2/1884 | Carly | ........................... | 40/479 |
| 311,877 A * | 2/1885 | Danz, Jr. | .......................... | 43/3 |
| 482,178 A * | 9/1892 | Irish | ............................. | 40/479 |
| 492,229 A * | 2/1893 | Piper | .......................... | 116/175 |
| 574,411 A * | 1/1897 | Gassett | ........................ | 40/479 |
| 575,283 A * | 1/1897 | Frantz | ............................. | 43/3 |
| 673,846 A * | 5/1901 | Rauert | .............................. | 43/3 |
| 677,118 A * | 6/1901 | Coudon | ............................. | 43/3 |
| 694,732 A * | 3/1902 | Coudon | ............................. | 43/3 |
| 710,433 A * | 10/1902 | Coudon | ............................. | 43/3 |
| 722,682 A * | 3/1903 | Dills | ............................... | 43/3 |
| 735,314 A * | 8/1903 | Syms | ............................... | 43/3 |
| 760,683 A * | 5/1904 | Coudon | ............................. | 43/3 |
| 796,147 A * | 8/1905 | Reynolds | ......................... | 43/3 |
| 883,161 A * | 3/1908 | Rosentreter | ...................... | 43/3 |
| 895,892 A * | 8/1908 | Peters | .......................... | 40/479 |
| 917,988 A * | 4/1909 | Barratt | ........................ | 40/479 |
| 938,710 A * | 11/1909 | Russell | ........................ | 40/479 |
| 942,103 A * | 12/1909 | Rigney | ............................ | 43/2 |
| 949,538 A * | 2/1910 | Igelstroem | ................... | 40/617 |
| 954,525 A * | 4/1910 | Lefevre | ........................ | 40/479 |
| 960,316 A * | 6/1910 | Hanlon | ........................ | 40/479 |
| 977,787 A * | 12/1910 | Davis | ............................... | 43/3 |
| 983,684 A * | 2/1911 | Clapp | .......................... | 40/479 |
| 1,062,713 A * | 5/1913 | Johnson | ........................... | 43/3 |
| 1,088,603 A * | 2/1914 | Masuzawa | ................... | 40/479 |
| 1,133,583 A * | 3/1915 | Simmons | .................... | 116/175 |
| 1,183,567 A * | 5/1916 | Johnson | ........................... | 43/3 |
| 1,284,909 A * | 11/1918 | Rose et al. | .................... | 40/479 |
| 1,376,282 A * | 4/1921 | Kauffman | ......................... | 43/2 |

(Continued)

FOREIGN PATENT DOCUMENTS

FR       2820949 A1 *   8/2002

*Primary Examiner*—Darren W Ark
(74) *Attorney, Agent, or Firm*—Michael R. Philips

(57) ABSTRACT

An animal decoy is provided that is easy to assemble for field use and easy to transport. The animal decoy has three panels assembled to one another to extend outward at approximately equal angles from a central point. Each panel has a cutout in the body area in which a flexible link suspends a tail to be freely moved by a breeze. The panels are assembled by resilient straps to be folded for transport and storage and quickly unfolded for field use. A realistic decoy of the rear of an animal is seen when viewed from any angle, with a tail that moves in natural fashion.

9 Claims, 3 Drawing Sheets

U.S. PATENT DOCUMENTS

| | | | | |
|---|---|---|---|---|
| 1,437,764 A * | 12/1922 | Lloyd | | 43/3 |
| 1,459,866 A * | 6/1923 | Vest | | 40/479 |
| 1,473,612 A * | 11/1923 | Dewey | | 43/3 |
| 1,485,514 A * | 3/1924 | McGuire | | 40/479 |
| 1,535,844 A * | 4/1925 | McLemore | | 40/563 |
| 1,542,738 A * | 6/1925 | Smith | | 40/479 |
| 1,571,711 A * | 2/1926 | Dewey | | 43/3 |
| 1,588,127 A * | 6/1926 | Miller | | 116/173 |
| 1,635,915 A * | 7/1927 | White | | 40/617 |
| 1,717,742 A * | 6/1929 | Smith | | 40/477 |
| 1,746,640 A * | 2/1930 | Emoff | | 43/3 |
| 1,767,570 A * | 6/1930 | Ashworth | | 40/479 |
| 1,928,449 A * | 9/1933 | Fugman | | 40/479 |
| 2,030,769 A * | 2/1936 | Slattengren | | 40/479 |
| 2,069,110 A * | 1/1937 | Naus | | 40/479 |
| 2,094,942 A * | 10/1937 | Frye | | 40/479 |
| 2,154,031 A * | 4/1939 | Bunting | | 446/217 |
| 2,313,353 A * | 3/1943 | Mills | | 43/3 |
| 2,536,338 A * | 1/1951 | Withey et al. | | 43/3 |
| 2,693,044 A * | 11/1954 | Roemisch | | 40/479 |
| 2,710,472 A * | 6/1955 | Leander | | 40/479 |
| 2,763,952 A * | 9/1956 | Bruce | | 43/3 |
| 2,781,017 A * | 2/1957 | Fuller et al. | | 116/63 R |
| 2,783,572 A * | 3/1957 | Rohan | | 43/3 |
| 2,810,223 A * | 10/1957 | Fraesdorf, Jr. | | 40/479 |
| 2,828,566 A * | 4/1958 | Cytron et al. | | 40/333 |
| 2,833,065 A * | 5/1958 | Kies | | 40/479 |
| 2,870,557 A * | 1/1959 | Cook | | 40/479 |
| 2,948,257 A * | 8/1960 | Levey | | 40/479 |
| 2,952,090 A * | 9/1960 | Pittenger | | 43/3 |
| 2,993,287 A * | 7/1961 | Goesle | | 40/477 |
| 3,002,306 A * | 10/1961 | Ruff, Sr. | | 116/173 |
| 3,073,047 A * | 1/1963 | Jones | | 40/479 |
| 3,090,142 A * | 5/1963 | Anderson | | 40/479 |
| 3,438,651 A * | 4/1969 | Hertoghe et al. | | 116/173 |
| 3,579,885 A * | 5/1971 | Iverson | | 40/607.03 |
| 3,707,798 A * | 1/1973 | Tryon | | 43/3 |
| 3,905,681 A * | 9/1975 | Nagel | | 446/217 |
| 4,017,991 A * | 4/1977 | Berger | | 40/440 |
| 4,353,179 A * | 10/1982 | Jennings | | 40/479 |
| 4,392,316 A * | 7/1983 | Thomas | | 40/617 |
| 4,620,385 A * | 11/1986 | Carranza et al. | | 43/3 |
| 4,651,457 A * | 3/1987 | Nelson et al. | | 43/3 |
| 4,852,288 A * | 8/1989 | Payne et al. | | 43/2 |
| 4,991,335 A * | 2/1991 | Krautsack | | 40/617 |
| 5,029,408 A * | 7/1991 | Smith | | 43/1 |
| 5,249,771 A * | 10/1993 | Wear | | 40/617 |
| 5,335,438 A * | 8/1994 | Terrill | | 43/2 |
| 5,363,792 A * | 11/1994 | Petechik | | 116/28 R |
| D360,370 S * | 7/1995 | Roth, Jr. | | D10/59 |
| 5,546,692 A * | 8/1996 | Byers | | 43/2 |
| 5,572,945 A * | 11/1996 | Eastaugh | | 116/173 |
| 5,606,815 A * | 3/1997 | Feldwhere | | 40/607.03 |
| 5,609,122 A * | 3/1997 | Jimmie | | 116/173 |
| 5,791,081 A * | 8/1998 | Turner et al. | | 43/2 |
| 5,816,187 A * | 10/1998 | Jimmie | | 116/173 |
| 5,832,649 A * | 11/1998 | Kilgore | | 43/2 |
| 5,862,619 A * | 1/1999 | Stancil | | 43/2 |
| 5,884,427 A * | 3/1999 | Lenz | | 43/2 |
| 5,953,841 A * | 9/1999 | Sawyer | | 40/479 |
| 6,021,594 A * | 2/2000 | Krueger | | 43/2 |
| 6,050,017 A * | 4/2000 | Barry | | 43/2 |
| 6,178,673 B1 * | 1/2001 | Blackford et al. | | 40/440 |
| 6,195,923 B1 * | 3/2001 | Gorman | | 40/479 |
| 6,206,747 B1 * | 3/2001 | Skwarek | | 446/217 |
| 6,266,904 B1 * | 7/2001 | Zheng | | 116/173 |
| 6,398,615 B1 * | 6/2002 | Wu et al. | | 446/217 |
| 6,470,620 B1 * | 10/2002 | Acker | | 43/3 |
| 6,510,644 B1 * | 1/2003 | Gollnik | | 43/2 |
| 6,530,338 B2 * | 3/2003 | Okumura et al. | | 116/173 |
| 6,532,693 B2 * | 3/2003 | Sides | | 43/2 |
| 6,557,482 B1 * | 5/2003 | Doty et al. | | 446/217 |
| 6,640,483 B2 * | 11/2003 | Nelson | | 43/2 |
| 6,722,077 B2 * | 4/2004 | Heiges | | 43/3 |
| 6,782,653 B1 * | 8/2004 | Thomas | | 43/2 |
| 6,807,765 B2 * | 10/2004 | Watermann | | 43/2 |
| 6,901,693 B1 * | 6/2005 | Crowe | | 43/2 |
| 6,957,509 B2 * | 10/2005 | Wright | | 43/2 |
| 7,131,230 B1 * | 11/2006 | Gilsdorf | | 43/2 |
| 7,156,044 B1 * | 1/2007 | Davis | | 40/479 |
| 7,389,606 B2 * | 6/2008 | McLeod | | 43/2 |
| 2003/0208944 A1 * | 11/2003 | Olson et al. | | 43/3 |
| 2004/0098893 A1 * | 5/2004 | Bardeleben | | 40/479 |
| 2006/0032104 A1 * | 2/2006 | Brunner et al. | | 43/2 |
| 2007/0137092 A1 * | 6/2007 | Butz | | 43/3 |
| 2008/0216382 A1 * | 9/2008 | Rohrke | | 43/2 |

* cited by examiner

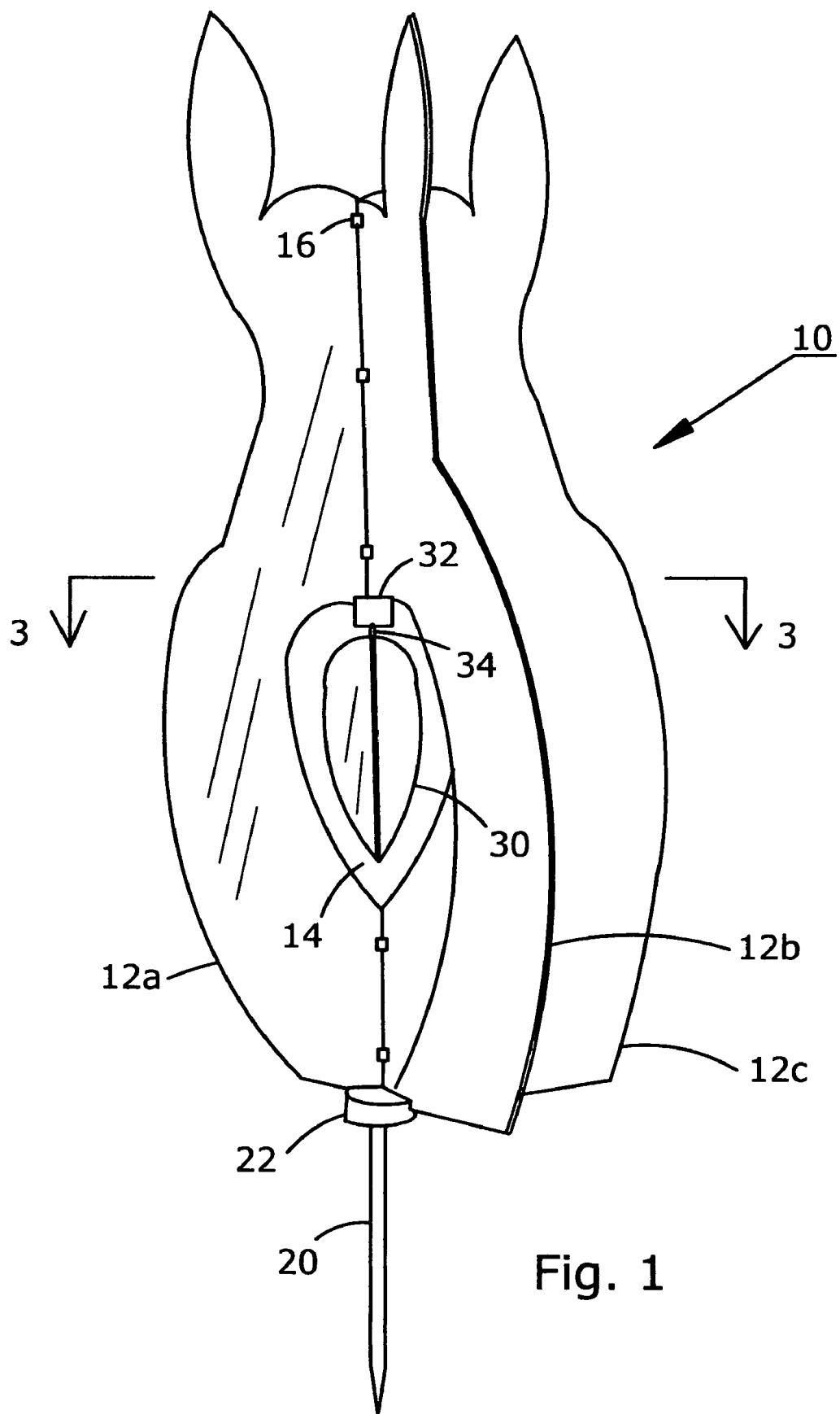

ANIMAL DECOY

FIELD OF THE INVENTION

The present invention relates to the field of hunting decoys, and more particularly to deer decoys.

BACKGROUND OF THE INVENTION

Animals communicate and convey emotions through what is commonly referred to as "body language." In the case of many mammalian animals, including deer, the tail is a strong indicator of mood. When the animal is basically happy, the tail is active. When the animal is nervous, the tail is still, often held between the rear legs. In this manner, approaching animals receive non-verbal information from another animal in an area. If a large animal, e.g. a deer, is comfortably grazing, the tail is likely to be moving to indicate a safe environment and a happy mood.

Hunters use decoys to attract prey and improve the chance of having a successful hunt. Generally, the hunter treks a long distance into the woods for hunting. Since preferred prey are generally fairly large animals, the known decoys are large and difficult to transport. In certain cases, deer or similar decoys are made of multiple parts to be transported more easily. Such decoys require assembly for use and disassembly after use, which can be a time consuming task. Even when disassembled, the known large animal decoys are heavy and awkward to carry. Therefore, a need exists for a deer decoy that is easy to assemble and disassemble, lightweight and easy to carry. These criteria must be met while maintaining a high degree of decoy effectiveness.

SUMMARY OF THE INVENTION

The animal decoy of the present invention has three panels that are connected with straps. In transport condition, the three panels are folded into flat contact with one another. In condition for field use, the three panels are spread to extend out from a central connection hub. Each panel is in the form of one half the head and body of an animal, e.g. a deer, as seen from the rear. The three-panel field use assembly shows a rear profile of the animal from any viewing angle. The panels each have a cutout in the body portion sized to frame a tail that is hung therein by a flexible link, allowing the tail to swing naturally in a breeze. Cavities are provided on a tail suspender block to hold animal decoy scent.

BRIEF DESCRIPTION OF THE DRAWINGS

The present invention is best understood in conjunction with the accompanying drawing figures in which like elements are identified by similar reference numerals and wherein:

FIG. 1 is a perspective view of the animal decoy of the invention in fully assembled condition for field use.

DETAILED DESCRIPTION OF THE PREFERRED EMBODIMENTS

Figure 2A:
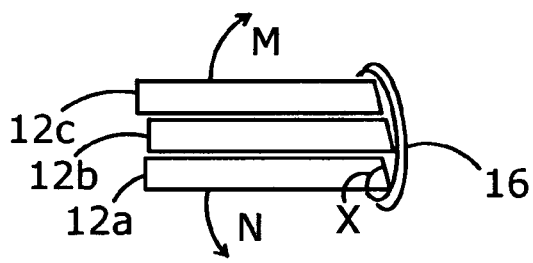
FIG. 2A is a top plan view of the animal decoy of FIG. 1 in folded condition for transport or storage.

Referring now to FIG. 1, animal decoy 10 is shown in top perspective view as being formed of three substantially planar panels 12a, 12b and 12c. Each panel 12 is in the form substantially of one half an animal head and body as seen from behind. When two panels 12 are placed linearly next to one another, the appearance is of a complete deer head and body. Animal decoy 10 is preferably formed of three panels that are assembled at 120° angular spacing. With all three panels 12 being identical and thus assembled, a profile is seen of the rear of a full animal head and body from any viewing angle. While the description and drawing figures depict a deer, it is understood that the principles of the invention pertain to a variety of game animals. Panels 12a, 12b, 12c are attached to one another along mating edges by elastic connectors 16, such as the self-locking plastic straps commonly used to bind a bundle of electrical wires together. A support 20 is connected by a support cap 22 that is configured to engage the lower edges of panels 12a, 12b, 12c. In the preferred embodiment of the invention, support 20 is a hollow tube with a pointed lower end adapted for being driven into the ground for securely supporting animal decoy 10. Alternate forms of support, e.g. a pedestal base, is considered within the scope of the present invention.

Each panel 12a, 12b, 12c is formed with a cutout 14 to create a cage-like opening when decoy 10 is assembled as shown. A tail suspender block 32, to be described below, is mounted to the converging edges of panels 12a, 12b, 12c at the upper end of cutout 14. A tail 30 is suspended in cutout 14 from tail suspender block 32 by a flexible link 34, for example a loop of monofilament nylon fishing line, to allow tail 30 to freely move when contacted by a breeze. Tail 30 is also formed from three panels to appear three-dimensional and realistic when viewed from any angle. Tail 30 is smaller than cutout 14 to avoid contact with panels 12a, 12b, 12c, thus remaining free to sway and rotate. The location of cutout 14, and therefore tail 30, is the approximate anatomical position of a tail on an animal in relation to the head. Therefore, in field use, decoy 10 is placed in a forest setting with tail 30 suspended in cutout 14. A breeze will cause tail 30 to swing from side to side, with the top of tail 30 connected to decoy 10 by link 34 and the bottom of tail 30 moving through an arc simulating natural tail movement. With tail 30 in swinging motion and decoy 10 stationary, a live animal approaching from any direction will perceive a content companion and will likely come closer to join in. Whereas the preferred embodiment of the present invention utilizes three body panels, it is recognized that an animal decoy having four or five panels would function similarly.

Referring now to FIG. 2A, panels 12a, 12b, 12c are depicted in folded condition for ease of carrying or storage. Panels 12a, 12b, 12c are in parallel contact with one another with connector 16 maintaining the integrity of the assembly. The inner edges of each panel 12a, 12b, 12c are formed at an angle X of approximately 60° to the plane of the major surfaces thereof to create a stable structure when panel 12a is rotated in the direction of arrow N and panel 12c is rotated in the direction of arrow M during assembly to form the configuration shown in FIG. 3. Connector 16 is assembled through panels 12a, 12b, 12c snugly enough to hold the panels closely together, while providing some slack and elasticity to allow the panels to be rotated as described.

Figure 2B:
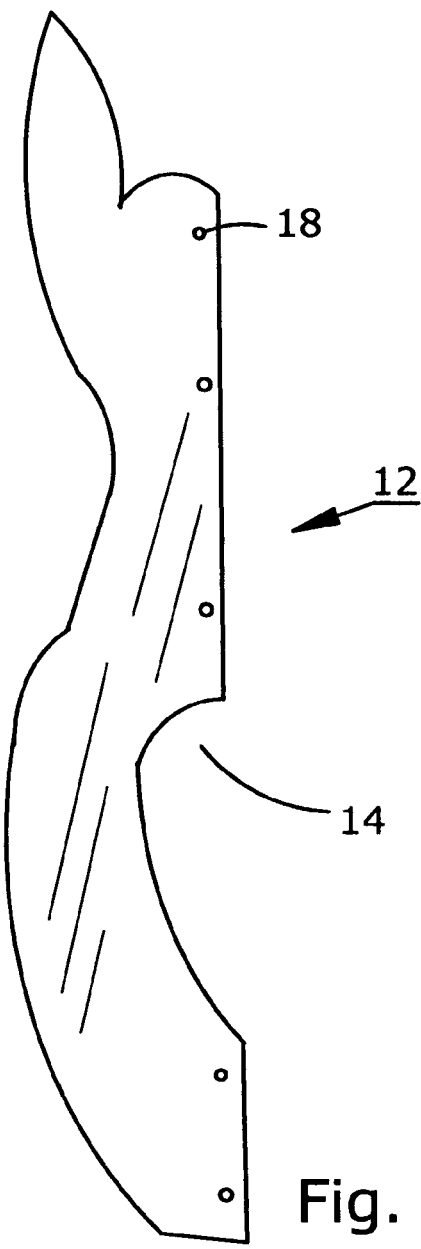
FIG. 2B is a side elevation view of one panel of the animal decoy of FIG. 1.

Referring now to FIG. 2B, a single panel 12 is illustrated in side elevation view. It is noted that all panels 12 are substantially identical. A series of holes 18 are formed through panel 12 a selected distance from the linear edge thereof. Holes 18 are provided for receiving a series of connectors 16 (see FIG. 2A) to hold the three panels 12 together. Cutout 14 is formed in an shape to surround an animal's tail.

Figure 3:
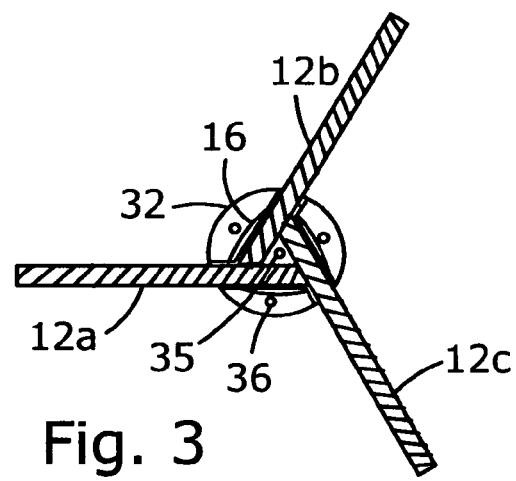
FIG. 3 is a cross sectional view of the animal decoy of FIG. 1 taken in the direction indicated by line 3-3.

Referring now to FIG. 3, a cross sectional plan view of assembled decoy 10 is illustrated as taken in the direction of line 3-3 of FIG. 1. Panels 12a, 12b, 12c are spread apart at equiangular orientations, being approximately 120° from one another. Panels 12a, 12b, 12c are held together with connector 16. Connector 16 is under tension with panels 12a, 12b, 12c spread out as shown. Tail suspender block 32 is mounted to the edge of each panel 12a, 12b, 12c at the top of cutout 14 (see FIG. 1). The angled edge of panel 12a engages the flat side surface of panel 12c, with similar engagements between panels 12c and 12b, 12b and 12a, leaving an open equilateral triangle between their mating edges. A hole 35 is formed through tail suspender block 32 for installation of link 34 (see FIG. 1).

Figure 4A:
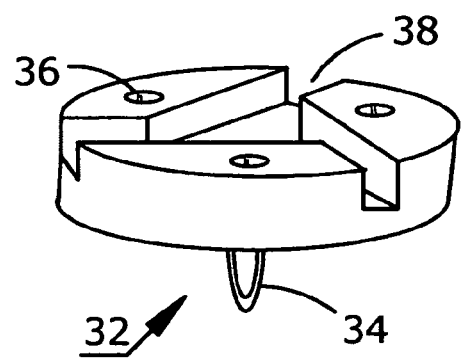
FIG. 4A is a perspective view of a tail suspender of the invention.

Referring now to FIG. 4A, a perspective view of tail suspender block 32 is shown with flexible link 34 extending from the lower surface thereof. Link 34 is preferably assembled to tail suspender block 32 by tying through hole 35 (see FIG. 3) through the center of tail suspender block 32. Three channels 38 are formed in the upper surface of tail suspender block 32. Channels 38 are oriented at approximately 120° to one another and offset from the center of the circle to match the open triangle formed by the intersection of panels 12a, 12b, 12c (see FIG. 3). The width of each channel 38 is sized to snugly hold panels 12a, 12b, 12c, respectively. An array of cavities 36, e.g. three cavities, are formed in the upper surface of tail suspender block 32 to provide receptacles for holding a liquid or solid animal scent to enhance the decoy.

Figure 4B:
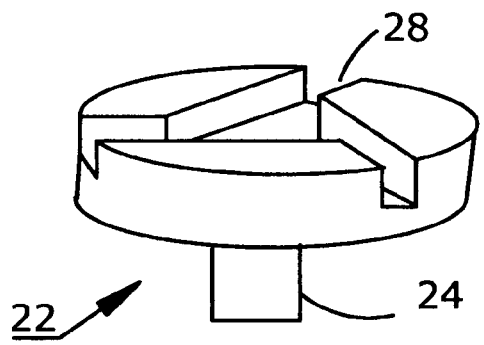
FIG. 4B is a perspective view of a support cap of the invention.

Referring now to FIG. 4B, support cap 22 is shown in perspective view. The upper surface of support cap 22 is formed with a series of three channels 28 that are oriented at approximately 120° to one another and offset from the center of the circle to match the open triangle formed by the intersection of panels 12a, 12b, 12c (see FIG. 3). The width of each channel 28 is sized to snugly hold panels 12a, 12b, 12c, respectively. A plug 24, in the form of a short rod or an open structure, e.g. a starburst, is provided on the lower surface of support cap 22 at a size for snugly fitting into the upper end of support 20 (see FIG. 1). As assembled, support cap 22 is mounted to the lower edge of panels 12a, 12b, 12c and plug 24 is mounted snugly to the upper end of support 20. Support 20 is then thrust into the ground to hold the animal decoy upright.

Figure 5:
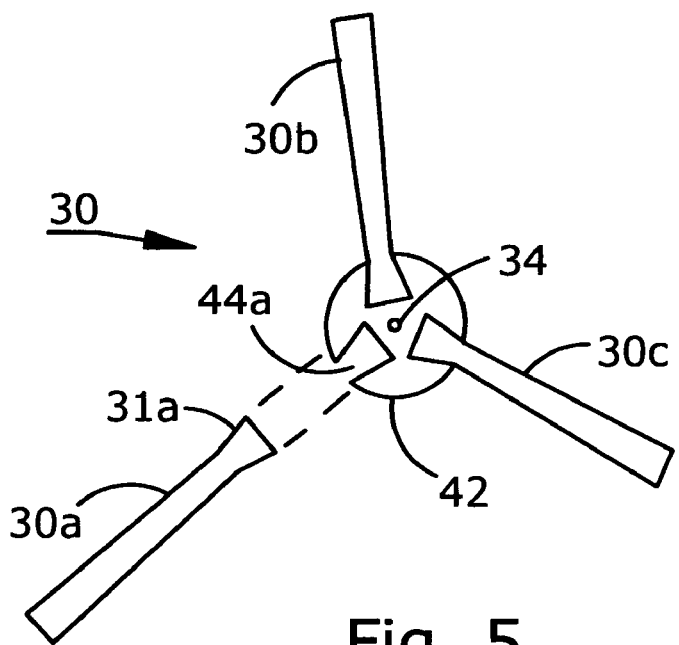
FIG. 5 is an exploded top plan view of a tail coupling and three tail panels of the invention.

Referring now to FIG. 5, tail 30 is illustrated in exploded top plan view. Tail 30 is made up of three tail panels 30a, 30b and 30c that are each assembled to a tail coupling 42. Typical tail panel 30a is formed with an edge 31a, e.g. a dovetail edge, for engaging a similarly shaped typical slot 44a in tail coupling 42. Alternately, edge 31a of tail panel 30a is straight, slot 44a has straight sides, and the assembly is accomplished with adhesive. Whereas tail 30 is small compared to the total decoy 10 (see FIG. 1), it is contemplated that once assembled, tail 30 will remain as a unit.

Figure 6:
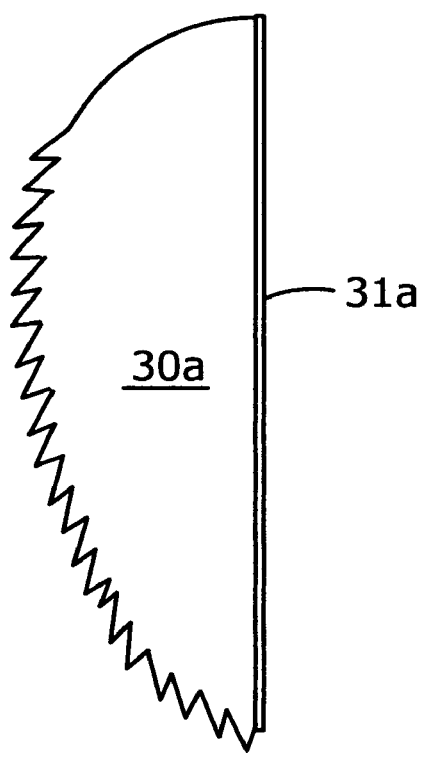
FIG. 6 is a side elevation view of one panel of the tail.

Referring now to FIG. 6, typical tail panel 30a is shown in side elevation view. Tail panel 30a has a generally curved outer edge that is formed with feathering to simulate an animal's tail. The opposed edge 31a is substantially linear when seen in elevation. Edge 31a may be formed along the entire length of tail panel 30a or a shorter section thereof, to match the length of tail coupling 42 (see FIG. 5).

Figure 7:
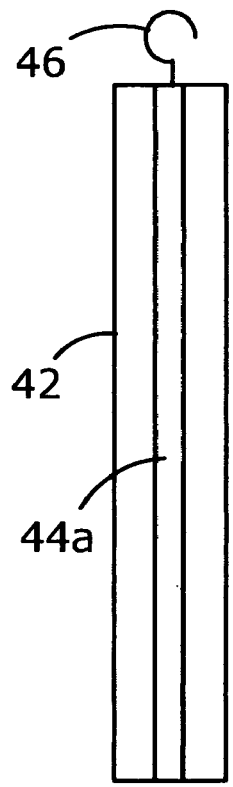
FIG. 7 is a side elevation view of the tail coupling of the invention.

Referring now to FIG. 7, tail coupling 42 is shown in side elevation view from one aspect, the alternate two aspects, being offset by 120°, are similar. Slot 44a, described above as shaped for engaging an edge of a tail panel, extends parallel to the longitudinal direction of tail coupling 42 from a first end to a second end thereof. Alternately, tail coupling 42 may be shorter than the entire length of typical tail panel 30a (see FIG. 6), with engaging edge 31a of similar length. A hook or similar connector 46 is mounted into the top end of tail coupling 42. Hook 46 is provided for hanging assembled tail 30 (see FIG. 1) from link 34, with link 34 being suspended from tail suspender 32.

In order to create the appearance of a live animal, each of panels 12a, 12b, 12c and tail panels 30a, 30b, 30c are painted or otherwise colored appropriately. The total presentation of a properly colored animal head and body emitting an animal scent and having a swinging tail is clearly an invitation to a live animal to approach.

While the description above discloses preferred embodiments of the present invention, it is contemplated that numerous variations and modifications of the invention are possible and are considered to be within the scope of the claims that follow.

What is claimed is:

1. An animal decoy, comprising:
   a. three substantially planar panels rotatably assembled to one another in a manner allowing the panels to be moved between a first condition with the panels in parallel contact with one another for transport and a second condition with the panels extending outwardly from a common center at an acute angle to one another for field use;
   b. the three panels each having a first edge formed in a shape of one half of an animal body as seen from behind and a second edge being substantially linear and juxtaposed to the first edge;
   c. the second substantially linear edge of each panel formed at an angle to planar surfaces of each respective panel, the angle oriented for engaging the planar surface of an adjacent panel when the three panels are in the second condition;
   d. the three panels each being further formed with a cutout forming a gap in the substantially linear edge thereof, the gap sized to accommodate a tail; and
   e. a tail suspended within the cutout in each panel, the tail having a top end and a bottom end and a longitudinal axis defined therebetween, the tail being suspended from the top end thereof such that the longitudinal axis of the tail is generally parallel to the second substantially linear edge of each panel;
   f. wherein in the second condition for field use the second substantially linear edge formed at an angle of each panel contacts the planar surface of an adjacent panel of the three panels proximate the second substantially linear edge formed at an angle of the adjacent panel of the three panels to position the first edge formed in a shape of one half of an animal body such that the first edge is extended outwardly from the common center.

2. The animal decoy described in claim 1, wherein the tail is suspended on a substantially flexible link to allow the tail to be moved by a breeze.

3. The animal decoy described in claim 1, wherein the tail is formed of three panels oriented at an acute angle to one another.

4. The animal decoy described in claim 3, wherein the three panels of the tail are assembled to one another with an elongate tail coupling.

5. The animal decoy described in claim 1, further comprising a tail suspender member configured to engage the three panels within the cutout and suspend the tail.

6. The animal decoy described in claim 5, wherein the tail suspender member is formed with one or more cavities for receiving decoy scent material to attract a live animal.

7. The animal decoy described in claim 1, further comprising elastic strap means for connecting the three substantially planar panels to one another.

8. The animal decoy described in claim 1, further comprising means to support the animal decoy in a substantially upright orientation in use.

9. The animal decoy described in claim 1, wherein the second substantially linear edge formed at an angle is formed at substantially 60° to a plane of the respective planar panel and the planar panels are assembled in orientation to form an open triangle of the three planar panels when in the second condition.

\* \* \* \* \*